United States Patent Office 3,370,903
Patented Feb. 27, 1968

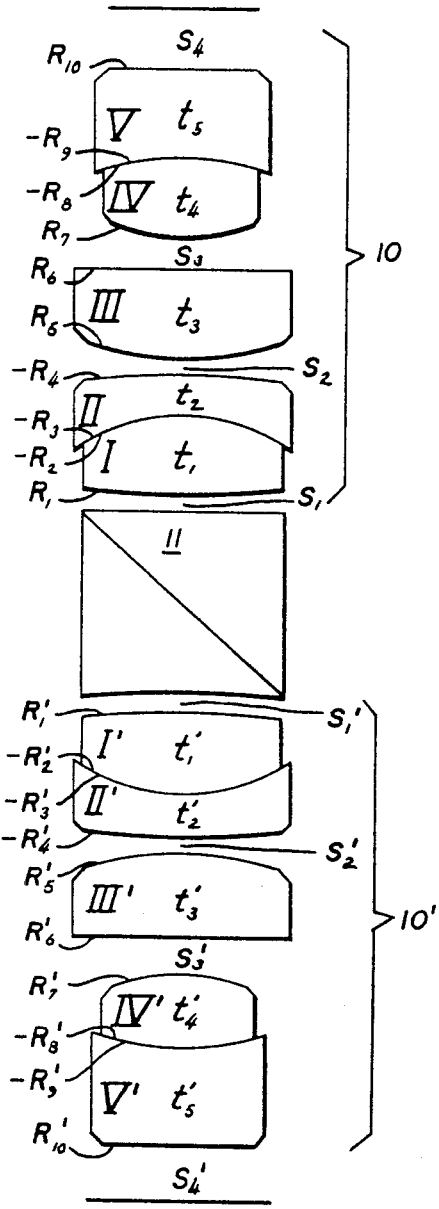

3,370,903
UNIT MAGNIFICATION OPTICAL SYSTEM FOR ANGULAR MEASURING INSTRUMENTS
John M. Schwartz, Irondequoit, N.Y., assignor to Bausch & Lomb Incorporated, Rochester, N.Y., a corporation of New York
Filed July 2, 1964, Ser. No. 379,992
2 Claims. (Cl. 350—202)

ABSTRACT OF THE DISCLOSURE

A substantially symmetrical lens system composed of two similar mutually spaced objectives which are positioned back-to-back in operative position between measuring scale and a reticle so that an unaberrated image of the scale is superimposed on said scale or vice versa, and between said objectives is optically aligned a beam splitting glass cube having an optical refractive surface formed thereon normal to the axis of said objectives whereby lateral movement of said cube results in relative motion of said scale and reticle.

---

This invention relates to a novel optical system and more particularly to a unit magnification system for use in a microscope or the like.

Angular measuring instruments of the type having circular rulings and means sensing the positions of those rulings have recently been developed. The recently developed instruments have the potential to detect rotational movement of extremely small magnitudes. Such devices should detect angular milliseconds when properly equipped with precision optical systems. For example, the devices which are disclosed and claimed in the copending application of Kreckel et al., 275,540, filed Apr. 25, 1963 and assigned to the same assignee as the present invention are designed to detect and indicate minute rotational displacements. Accordingly, they have created a demand for a precision optical system.

Measuring systems such as those disclosed in the aforementioned application include an imaging system for superimposing an image of a reticle and a scale, so that, an angular displacement of a portion of a cycle (a cycle being one transparent and one opaque area) progressing from one reticle to another may be accurately measured. The imaging means for optically imaging areas of the scale or to image different ones of the reticles onto different portions of the scale to thereby regulate the light intensity are utilized in those systems. The optical systems disclosed and claimed herein have been designed particularly for the requirements of those instruments disclosed and claimed in the aforementioned application. The particular problems relating to those devices have been overcome to a relatively high degree by the system disclosed and claimed herein.

For example, the lens systems image each of eight areas of a scale onto each of eight reticles at unit magnification. The spacings between the scale divisions are relatively small, i.e., in the range of two seconds of arc and interpolation to 100 seconds of arc for a 500 millimeter diameter circular scale are obtainable with the present optical system. The aberrations of the optical system have been minimized while the long conjugate distances were increased to infinity. Further the third order or Seidel aberrations were corrected for the particular application.

Briefly, the present invention comprises a pair of objectives placed back to back with their long conjugates at infinity to thereby obtain a unit magnification system. The separation of the objectives is such that they are separated by a distance which is nearly equal to twice the exit pupil distance from the lens vertex nearest to the long conjugate. A beam splitter prism is inserted between the two objectives. Each of the objectives include the following axially aligned elements I through V. Elements I through V are taken from the prism.

The element I defines a double convex lens having the longer radius on the side of the prism. A second element II comprises a convex concave lens with the concave surface having a radius which matches the shorter radius of the element I and is cemented thereto to form a compound lens. A plano convex singlet makes up the element III and is airspread from the doublet I–II and a doublet IV, V. The doublet IV, V includes a double convex lens IV with its shortest radius closest to the prism. The element V defines a plano concave lens wherein the radius of the concave surface matches the rear convex surface of the element IV.

The lens system according to the present invention will now be described in connection with the accompanying drawing; in which:

The single figure of the drawing is an axial section of a lens system according to the present invention.

The lens system shown in the drawing comprises a pair of objective lenses 10 and 10' and a beam splitter 11 separating the two objectives. The objectives 10 and 10' are disposed in a back to back relationship with their long conjugates at infinity. Minimum aberrations were maintained in the systems by constructing each of the two objectives 10 and 10' including the elements I through V and I' through V' respectively in accordance with the constructional data shown in Table A.

TABLE A $45.00 < R_1', R_1 < 55.00$
$8.01 < R_2' R_2 < 9.79$
$8.01 < R_3', -R_3 < 9.79$
$28.90 < R_4', -R_4 < 35.32$
$13.32 < R_5', R_5 < 16.28$
$R_6', R_6 = \infty$
$7.65 < R_7', R_7 < 9.35$
$11.49 < -R_8', -R_8 < 14.05$
$11.49 < -R_9', -R_9 < 14.05$
$R_{10}', R_{10} = \infty$
$3.55 < t_1', t_1 < 4.33$
$1.77 < t_2', t_2 < 2.17$
$3.51 < t_3', t_3 < 4.29$
$3.39 < t_4', t_4 < 4.15$
$3.67 < t_5', t_5 < 4.49$
$0.270 < S_1', S_1 < 0.330$
$0.576 < S_2', S_2 < 0.704$
$1.503 < S_3', S_3 < 1.837$
$2.394 < S_4', S_4 < 2.926$ wherein $R_1$ to $R_{10}$ and $R_1'$ to $R_{10}'$ are the radii of the successive lens surfaces $t_1$ to $t_5$ and $t_1'$ to $t_5'$ are the axial thicknesses of said elements therebetween and $S_1$ to $S_4$ and $S_1'$ to $S_4'$ are the axial spacings.

The minus (—) sign used with certain of the R values means that such a surface is concave toward the beam splitter cube 11.

For reasons such as resolving power, depth of focus, working distance and exit pupil location, the system uses two modified 0.40 NA .20× type microscope objectives.

The two objectives 10 and 10' are airspaced from each other by a distance of between 8.1 to 9.9 mm. A beam splitter cube 11 of between 8.4 and 9.6 mm. is disposed between the objectives and permits observation of the superposition of the scale and reticle images.

It is also desirable to construct the lens system in accordance with the specific constructional data set forth in Table B.

TABLE B $1.5170 < n_1', n_1 < 1.5190$
$1.7100 < n_2', n_2 < 1.7300$
$1.5790 < n_3', n_3 < 1.5990$
$1.5630 < n_4', n_4 < 1.5850$
$1.5650 < n_5', n_5 < 1.5850$
$54.6 < \nu_1', \nu_1 < 64.6$
$24.3 < \nu_2', \nu_2 < 34.3$
$56.2 < \nu_3', \nu_3 < 66.2$
$52.4 < \nu_4', \nu_4 < 62.4$
$36.4 < \nu_5', \nu_5 < 46.4$ wherein $n_1$ to $n_5$ and $n_1'$ to $n_5'$ are the indices of refraction and $\nu_1$ to $\nu_5$ and $\nu_1'$ to $\nu_5'$ are the Abbe numbers of the elements I through V, I' through V' respectively.

Minimum aberrations were maintained or minimized in the lens systems according to the present invention while setting the long conjugate distances at infinity in order to obtain optimum performance of the system. For example, the third order on Seidel aberration coefficients for a single objective are listed below for object distance equal to infinity.

| Aberration type: | Coefficients |
|---|---|
| Spherical | −.004972 |
| Coma | +.003257 |
| Astigmatism | −.000926 |
| Petzval curvature | −.003193 |
| Distortion | −.000870 |
| Longitudinal color | −.000737 |
| Lateral color | −.001714 |

When the pair of objectives are placed back to back in a symmetrical manner, the coma is substantially reduced. Lateral color and distortion are also reduced by the symmetry of the system. For example, the aberration coefficients for the novel combination of elements disclosed and claimed herein are as follows:

| Aberration type: | Coefficients |
|---|---|
| Spherical | −.007159 |
| Coma | +.000070 |
| Astigmatism | −.001376 |
| Petzval curvature | −.005343 |
| Distortion | +.000046 |
| Longitudinal color | −.001238 |
| Lateral color | +.000006 |

The two objectives 10 and 10' according to a preferred embodiment of the invention are separated by a distance of 9.6 mm. and a beam splitter cube 11, 9 mm. square, and preferably having an index of 1.5725 is disposed in the airspace which separates the objectives. The objective according to the preferred embodiments conform to the following specific constructional data shown in Table C.

TABLE C

| Element | Radius | Thickness or Spacing | Index of Refraction $n_D$ | Abbé Number $\nu$ |
|---|---|---|---|---|
| I', I | $R_1' , R_1 = 50.00$ | $S_1', S_1 = .3$ | | |
| | $-R_2', -R_2 = 8.90$ | $t_1', t_1 = 3.94$ | $n_1', n_1 = 1.5180$ | $\nu_1', \nu_1 = 59.6$ |
| II', II | $-R_3', -R_3 = 8.90$ | | | |
| | $-R_4', -R_4 = 32.11$ | $t_2', t_2 = 1.97$ | $n_2', n_2 = 1.7200$ | $\nu_2', \nu_2 = 29.3$ |
| III', III | $R_5', R_5 = 14.80$ | $S_2', S_2 = 0.64$ | | |
| | $R_6', R_6 = \text{Plano}$ | $t_3', t_3 = 3.90$ | $n_3', n_3 = 1.5890$ | $\nu_3', \nu_3 = 61.2$ |
| IV', IV | $R_7', R_7 = 8.50$ | $S_3', S_3 = 1.67$ | | |
| | $-R_8', -R_8 = 12.77$ | $t_4', t_4 = 3.77$ | $n_4', n_4 = 1.5730$ | $\nu_4', \nu_4 = 57.4$ |
| V', V | $-R_9', -R_9 = 12.77$ | | | |
| | $R_{10}', R_{10} = \text{Plano}$ | $t_5', t_5 = 4.08$ | $n_5', n_5 = 1.5750$ | $\nu_5', \nu_5 = 41.4$ |
| | | $S_4', S_4 = 2.66$ | | | wherein $R_1$ to $R_{10}$ and $R_1'$ to $R_{10}'$ are the radii of the lens surfaces of said elements, $t_1$ to $t_5$ are the axial thicknesses thereof, $S_1$ to $S_4$ and $S_1'$ to $S_4'$ are the axial spacings therebetween, $n_1$ to $n_5$ and $n_1'$ to $n_5'$ are the indices of refraction and $\nu_1$ to $\nu_5$ and $\nu_1'$ to $\nu_5'$ are the Abbe numbers of the elements I through V and I' through V' respectively of said two objectives.

While the invention has been described in connection with a specific application it may be modified or embodied in other forms without departing from the scope of the appended claims.

What is claimed is:

1. An optical system including a pair of similar objectives disposed in a back to back relationship with their long conjugates at infinity and a beam splitter cube disposed between said objectives, each of said objectives including five elements I through V and I' to V' respectively, a first element I defining a double convex lens having the longer radius on the side of the prism, a second element II comprising a convexo concave lens having a radius equal to the adjacent radius of element I and in contact therewith, a plano convex singlet III airspaced from the element II, and a doublet including elements IV and V airspaced from the singlet III, the doublet IV, V including a double convex lens IV having its shortest radius closest to the prism, the element V defining a plano-concave lens, said elements conforming substantially to the following constructional data:

wherein $R_1$ to $R_{10}$ and $R_1'$ to $R_{10}'$ are the radii of the lens surfaces of the elements, $t_1$ to $t_5$ and $t_1'$ to $t_5'$ are the axial thicknesses, $S_1$ to $S_4$ and $S_1'$ to $S_4'$ are the axial spacings, $n_1$ to $n_5$ and $n_1'$ to $n_5'$ are the indices of refraction and $\nu_1$ to $\nu_5$, $\nu_1'$ to $\nu_5'$ are the Abbe numbers of the respective elements I–V to I' to V', the minus (—) signs used with certain R values meaning that such a surface is concave toward said beam splitter cube.

2. An optical element according to claim 1 in which the beam splitter cube is approximately 9 mm. square and has an index of refraction of about 1.5725.

| Element | Radius | | Thickness or Spacing | Index of Refraction $n_D$ | Abbé Number $\nu$ |
|---|---|---|---|---|---|
| I', I | $R_1'$, $R_1 = 50.00$ | | $S_1'$, $S_1 = .3$ | | |
| | | | $t_1'$, $t_1 = 3.94$ | $n_1'$, $n_1 = 1.5180$ | $\nu_1'$, $\nu_1 = 59.6$ |
| II', II | $-R_2'$, $-R_2 = 8.90$ | | | | |
| | $-R_3'$, $-R_3 = 8.90$ | | $t_2'$, $t_2 = 1.97$ | $n_2'$, $n_2 = 1.7200$ | $\nu_2'$, $\nu_2 = 29.3$ |
| | $-R_4'$, $-R_4 = 32.11$ | | | | |
| | | | $S_2'$, $S_2 = 0.64$ | | |
| III', III | $R_5'$, $R_5 = 14.80$ | | $t_3'$, $t_3 = 3.90$ | $n_3'$, $n_3 = 1.5890$ | $\nu_3'$, $\nu_3 = 61.2$ |
| | $R_6'$, $R_6 = $ Plano | | | | |
| | | | $S_3'$, $S_3 = 1.67$ | | |
| IV', IV | $R_7'$, $R_7 = 8.50$ | | $t_4'$, $t_4 = 3.77$ | $n_4'$, $n_4 = 1.5730$ | $\nu_4'$, $\nu_4 = 57.4$ |
| | $-R_8'$, $-R_8 = 12.77$ | | | | |
| V', V | $-R_9'$, $-R_9 = 12.77$ | | $t_5'$, $t_5 = 4.08$ | $n_5'$, $n_5 = 1.5750$ | $\nu_5'$, $\nu_5 = 41.4$ |
| | $R_{10}'$, $R_{10} = $ Plano | | | | |
| | | | $S_5'$, $S_4 = 2.66$ | | |

References Cited

UNITED STATES PATENTS 1,945,977   2/1934   Oswald _____ 350—175 X

DAVID H. RUBIN, *Primary Examiner.*

JEWELL H. PEDERSEN, *Examiner.*

J. K. CORBIN, R. J. STERN, *Assistant Examiners.*

UNITED STATES PATENT OFFICE
CERTIFICATE OF CORRECTION

Patent No. 3,370,903                                          February 27, 1968

John M. Schwartz

It is certified that error appears in the above identified patent and that said Letters Patent are hereby corrected as shown below:

Column 2, TABLE A, line 3 thereof, "$8.01 < R_3'$, $-R_3 < 9.79$" should read -- $8.01 < -R_3'$, $-R_3 < 9.79$ --; same TABLE A, line 4 thereof, "$28.90 < R_4'$, $-R_4 < 35.32$" should read -- $28.90 < -R_4'$, $-R_4 < 35.32$ --. Column 3, TABLE B, line 4 thereof, "$1.5630 < n_4'$, $n_4 < 1.5850$" should read -- $1.5630 < n_4'$, $n_4 < 1.5830$ --.

Signed and sealed this 25th day of November 1969.

(SEAL)
Attest:

Edward M. Fletcher, Jr.                                WILLIAM E. SCHUYLER, JR.

Attesting Officer                                                    Commissioner of Patents